US009443662B2

(12) United States Patent
Ladanov et al.

(10) Patent No.: US 9,443,662 B2
(45) Date of Patent: Sep. 13, 2016

(54) MICROSTRUCTURED CRYSTALLINE DEVICE IN CONFINED SPACE, A DYE-SENSITIZED SOLAR CELL, AND METHOD OF PREPARATION THEREOF

(71) Applicant: UNIVERSITY OF SOUTH FLORIDA, Tampa, FL (US)

(72) Inventors: Mikhail Ladanov, Tampa, FL (US); Paula C. Algarin Amaris, Greensboro, NC (US); Garrett Matthews, Temple Terrance, FL (US); Manoj Kumar Ram, Palm Harbor, FL (US); Sylvia W. Thomas, Orlando, FL (US); Ashok Kumar, Tampa, FL (US); Jing Wang, Tampa, FL (US); Arash Takshi, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 383 days.

(21) Appl. No.: 14/074,280

(22) Filed: Nov. 7, 2013

(65) Prior Publication Data

US 2014/0124021 A1    May 8, 2014

Related U.S. Application Data

(60) Provisional application No. 61/723,402, filed on Nov. 7, 2012.

(51) Int. Cl.
*H01L 31/02* (2006.01)
*H01G 9/20* (2006.01)

(52) U.S. Cl.
CPC .......... *H01G 9/2036* (2013.01); *H01G 9/2045* (2013.01); *H01G 9/2059* (2013.01); *Y02E 10/542* (2013.01); *Y10T 428/24099* (2015.01)

(58) Field of Classification Search
CPC .......... H01L 31/0352; H01L 31/0336; H01L 31/0224; H01L 31/022466; H01L 31/035227; H01L 29/15
See application file for complete search history.

(56) References Cited

U.S. PATENT DOCUMENTS

| 7,972,900 B2 | 7/2011 | Tiwari et al. | |
| 7,989,349 B2 * | 8/2011 | Sandhu .................. | B82Y 10/00 257/E51.04 |

(Continued)

OTHER PUBLICATIONS

Bozic-Weber, B. et al., "Copper(I) dye-sensitized solar cells with $[Co(bpy)_3]^{2+/3+}$ electrolyte," *Chem Comm*, 2013, pp. 7222-7224, vol. 49.

(Continued)

*Primary Examiner* — Michael Lebentritt
(74) *Attorney, Agent, or Firm* — Saliwanchik, Lloyd & Eisenschenk

(57) ABSTRACT

A method of forming an ordered nanorods array in a confined space is used to form a high surface area device where an ensemble of parallel trenches has micrometer dimensions for the width and depth of the trenches, which are decorated with crystalline nanowires radiating from the sidewalls and bases of the trenches. The high surface area device is formed by depositing a conformal crystalline seed coating in the trenches, forming microchannels from these trenches by placing a barrier layer on the open surface of the trenches, contacting the conformal coating with a crystal precursor solution that is caused to flow through the microchannels. In an embodiment, a very high surface area electrode is constructed with ZnO nanowires radiating from the sidewalls and base of trenches formed on a silicon substrate. The device can be a dye-sensitized solar cell.

14 Claims, 7 Drawing Sheets

(56) References Cited

U.S. PATENT DOCUMENTS

| | | | |
|---|---|---|---|
| 2003/0217928 A1* | 11/2003 | Lin | B82Y 30/00 205/109 |
| 2004/0106218 A1* | 6/2004 | Wang | B82Y 10/00 438/15 |
| 2005/0214661 A1* | 9/2005 | Stasiak | B81B 7/0006 430/22 |
| 2006/0185578 A1* | 8/2006 | Jang | C30B 7/00 117/68 |
| 2007/0284573 A1 | 12/2007 | Tseng et al. | |
| 2009/0098043 A1 | 4/2009 | Song et al. | |
| 2011/0143464 A1 | 6/2011 | Chow et al. | |
| 2013/0019932 A1* | 1/2013 | Jung | H01G 9/2031 136/255 |
| 2014/0015548 A1* | 1/2014 | Naughton | G01R 27/26 324/658 |
| 2015/0194549 A1* | 7/2015 | Weman | H01L 31/022466 136/244 |

OTHER PUBLICATIONS

Burschka, J. et al., "Sequential deposition as a route to high-performance perovskite-sensitized solar cells," *Nature*, Jul. 18, 2013, pp. 316-320, vol. 499.

Karthikeyan, S. et al., Zinc-Porphyrin Based Dyes for Dye-Sensitized Solar Cells, *J. Phys. Chem. A.*, 2013, pp. 10973-10979, vol. 117.

Kim, B-G. et al., Molecular Design Principle of All-organic Dyes for Dye-Sensitized Solar Cells, *Chem. Eur. J.*, 2013, pp. 5220-5230, vol. 19.

Ladanov, M. et al., "Microfluidic hydrothermal growth of ZnO nanowires over high aspect ratio microstructures," *Nanotechnology*, 2013, pp. 375301-375309, vol. 24.

Nguyen, W.H. et al., "Molecular Engineering of Organic Dyes for Improved Recombination Lifetime in Solid-State Dye-Sensitized Solar Cells", *Chem. Mater.*, 2013, pp. 1519-1525, vol. 25.

Roy-Mayhew, J.D. et al., "Funtionalized Graphene as a Catalytic Counter Electrode in Dye-Sensitized Solar Cells," *ACS NANO*, 2010, pp. 6203-6211, vol. 4, No. 10.

Park, J. et al., "Molecular Engineering of Carbazole Dyes for Efficient Dye-Sensitized Solar Cells," *Bull. Korean Chem. Soc.*, 2013, pp. 1533-1536, vol. 34, No. 5.

Scrascia, A. et al., "Fluorine-thiophene-substituted organic dyes for dye sensitized solar cells," *J. Mater. Chem. A*, 2013, pp. 11909-11921, vol. 1.

Yum, J-H. et al., "Blue-Coloured Highly Efficient Dye-Sensitized Solar Cells by Implementing the Diketopyrrolopyrrole Chromophore," *Scientific Reports*, 2013, pp. 2446-2453, vol. 3.

Hamann, T.W., "The end of iodide? Cobalt complex redox shuttles in DSSCs," *Dalton Trans.*, 2012, pp. 3111-3115, vol. 41.

Sonmezoglu, S. et al., "High-efficiency dye-sensitized solar cells using ferrocene-based electrolytes and natural photosensitizers," *J. Phys. D: Appl. Phys.*, 2012, pp. 425101-425107, vol. 45.

Chen, R.S. et al., "Photoconduction Properties in Single-Crystalline Titanium Dioxide Nanorods with Ultrahigh Normalized Gain," *J. Phys. Chem. C*, 2012, pp. 4267-4272, vol. 116.

Chen, C.A. et al., "Growth and characterization of well-aligned densely-packed rutile $TiO_2$ nanocrystals on sapphire substrates via metal organic chemical vapor deposition," *Nanotechnology*, 2008, pp. 075611-075615, vol. 19.

Chen, R.S. et al., "Anomalous quantum efficiency for photoconduction and its power dependence in metal oxide semiconductor nanowires," *Nanoscale*, 2013, pp. 6867-6873, vol. 5.

Jiang, X. et al., "Ethylene glycol-mediated synthesis of metal oxide nanowires," *J. Mater. Chem.*, 2004, pp. 695-703, vol. 14.

Law, M. et al., "Nanowire dye-sensitized solar cells," *Nature Materials*, Jun. 2005, pp. 455-459, vol. 4.

Li, Z. et al., "Hydrothermal synthesis of nanowires, nanobelts, and nanotubes of vanadium oxides from one reaction system," *Int. J. Mater. Res.*, 2012, pp. 1-6, vol. 103.

Lin, C-H. et al., "High photocurrent gain in $SnO_2$ nanowires," *Applied Physics Letters*, 2008, pp. 112115-1 to 112115-3, vol. 93.

Yu, X. et al., "One-step ammonia hydrothermal synthesis of single crystal anatase $TiO_2$ nanowires for highly efficient dye-sensitized solar cells," *J. Mater. Chem. A.*, 2013, pp. 2110-2117, vol. 1.

Elam, J.W. et al., "Atomic Layer Deposition of Indium Tin Oxide Thin Films Using Nonhalogenated Precursors," *J. Phys. Chem. C.*, 2008, pp. 1938-1945, vol. 112.

Baruah, S. et al., "Hydrothermal growth of ZnO nanostructures," *Sci. Technol. Adv. Mater.*, 2009, pp. 013001-013018, vol. 10.

Bogle, K.A. et al., "Synthesis of Epitaxial Metal Oxide," *ACS Nano*, 2010, pp. 5139-5146, vol. 4, No. 9.

Kim, H-J. K, et al., "Photovoltaic Performance of a Novel $TiO_2$ Electrode Consisting of a Mesoporous $TiO_2$ Layer and a Compact $TiO_2$ Blocking Layer for Dye-Sensitized Solar Cells," *2010 International Conference on Biology, Environment and Chemistry*, pp. 178-182, IACSIT Press, Singapore, vol. 1.

Wilcox, W.R., "Crystallization Flow," *Journal of Crystal Growth*, 1972, pp. 93-96, vol. 12.

Gonzalez-Valls, I. et al., "Vertically-aligned nanostructures of ZnO for excitonic solar cells: a review," *Energy & Environmental Science*, 2009, pp. 19-34, vol. 2, No. 1.

Ke, L. et al., "Degradation mechanism of ZnO-based dye-sensitized solar cells," *Solar Energy Materials & Solar Cells*, 2010, pp. 323-326, vol. 94.

Keis, K. et al., "Nanostructured ZnO electrodes for dye-sensitized solar cell applications," *Journal of Photochemistry and Photobiology A: Chemistry*, 2002, pp. 57-64, vol. 148.

Kopidakis, N. et al., "Transport-Limited Recombination of Photocarriers in Dye-Sensitized Nanocrystalline $TiO_2$ Solar Cells," *J. Phys. Chem. B*, 2003, pp. 11307-11315, vol. 107, No. 41.

Martinson, A.B.F. et al., "ZnO Nanotube Based Dye-Sensitized Solar Cells," *NANO Letters*, 2007, pp. 2183-2187, vol. 7, No. 8.

Meng, Q.B. et al., "Fabrication of an Efficient Solid-State Dye-Sensitized Solar Cell," *Langmuir*, 2003, pp. 3572-3574, vol. 19.

Quintana, M. et al., "Comparison of Dye-Sensitized ZnO and $TiO_2$ Solar Cells: Studies of Charge Transport and Carrier Lifetime," *J. Phys. Chem C*, 2007, pp. 1035-1041, vol. 111.

Xu, C. et al. "Preferential Growth of Long ZnO Nanowire Array and Its Application in Dye-Sensitized Solar Cells," *J. Phys. Chem. C*, 2010, pp. 125-129, vol. 114.

Ahmad, S. et al., "Towards flexibility: Metal free plastic cathodes for Dye sensitized solar cells," *Chemical Communications*, 2012, pp. 9714-9716, vol. 48.

Xu, S. et al., "One-Dimensional ZnO Nanostructures: Solution Growth and Functional Properties," *Nano Research*, Nov. 2011, pp. 1031-1098, vol. 4, Issue 11.

Baxter, J.B. et al., "ZnO Nanowire Dye Sensitized Solar Cells," *Seminar presented Feb. 16, 2010 at Rutgers University*, p. 1.

\* cited by examiner

MICROSTRUCTURED CRYSTALLINE DEVICE IN CONFINED SPACE, A DYE-SENSITIZED SOLAR CELL, AND METHOD OF PREPARATION THEREOF

CROSS-REFERENCE TO RELATED APPLICATION

The present application claims the benefit of U.S. Provisional Application Ser. No. 61/723,402, filed Nov. 7, 2012, which is hereby incorporated by reference herein in its entirety, including any figures, tables, or drawings.

This invention was made with government support under Contract No. 0854023 awarded by the National Science Foundation. The government has certain rights in the invention.

BACKGROUND OF INVENTION

Metal oxide nanostructures have been used in a wide variety of different electronic, optoelectronic and electrochemical devices such as sensors, solar cells, lasers, transistors and supercapacitors. In addition to electronic and optical properties, the surface morphology of the nanostructures is critical for implantation in devices.

Dye-sensitized solar cell (DSSC) has long held promise as the next generation solar cell. One direction in that research has been toward the preparation of metal oxide, for example $TiO_2$, electrodes, as efficient DSSC electrodes that require extremely high surface areas to permit sufficient absorption of dye molecule to achieve high photocurrent generation. However, conventional metal oxide particle layers do not provide sufficient physical surface area per unit area to allow high light harvesting by the monolayer of adsorbed dye on the metal oxide surface. Research has primarily been directed to the preparation of mesoporous structures or assemblies of nanoparticles to address the surface area problem.

Concerning metal oxide nanoparticle assemblies, a desired form is densely packed, high aspect ratio vertically aligned nanowires, where promoting increasingly smaller diameters and longer lengths permits enormous surface areas for the process of charge separation. Furthermore, where the individual nanowires are a single crystal, efficient transport of electron to a contacting surface is enhanced.

Performance of devices as supercapacitor strongly depends on the surface area, which limits the charge-storing capacity. Vertically aligned and densely packed metal oxide nanowires grown on a planar substrate increase the specific surface area of an electrode. However, to further increase the specific surface area of an assembly of nanowires, a complex three dimensional topography is desirable. Conceptually, a simple topography for a high area surface would be an array of nanowires radiating from a patterned surface of deep trenches which display a high aspect ratio. Therefore, it is desirable to prepare topography by formation of a structure including metal oxide nanowires radiating from the surfaces of the sidewalls and bottom surfaces of deep trenches to dramatically increase the quantity of metal oxide nanowires and the resulting specific surface area for an electrode.

BRIEF SUMMARY

Embodiments of the invention are directed to a method to prepare a device with a very high surface area, where the surface comprises an ensemble of trenches, etched or formed by any other way, from which crystalline nanowires are formed on the sidewalls and base of the trenches. The nanowires are grown from a conformation coating of the polycrystalline thin film to act as a seeding layer for growth of the crystalline nanowires. A flowing crystal precursor solution is contacted with the conformational coating in the confined spaces of the trenches such that crystal growth forms crystalline nanowires radiating from the conformational coating on the walls of the trenches.

In an exemplary embodiment of the invention, a high surface area electrode is prepared by etching a series of parallel trenches by deep reactive ion etch (DRIE) in a silicon substrate, depositing a ZnO conformal coating by ALD, placing a barrier layer of PDMS over the open trenches to form microchannels, flowing a crystal precursor solution comprising an aqueous solution of zinc nitrate and hexamine in a hydrothermal manner through the microchannels to cause the growth of ZnO crystalline nanorods radiating from the sidewalls and base of the trenches, and removing the barrier layer to form the electrode.

DETAILED DISCLOSURE

Figure 1:
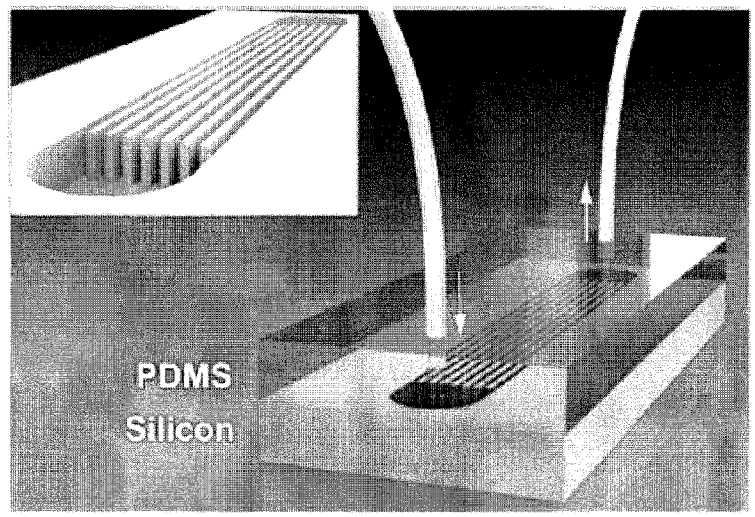
FIG. 1 shows a scribed silicon substrate with trenches covered by a PDMS barrier layer and tubes for the introduction and removal of crystal precursor solutions for preparation of a high surface area device comprising crystalline nanowires, according to an embodiment of the invention.

Embodiments of the invention are directed to a high surface area device comprising a multiplicity of nanowires radiating from the base and sidewalls of trenches scribed or otherwise formed on a flat substrate. Other embodiments of the invention are directed to a method of growing a multiplicity of nanowires within the confined dimensions of trenches that are formed on a substrate. Growth of nanowires radiating from the walls and base of a deep trench is achieved by a hydrothermal method. Crystal growth requires the steps of: conformal deposition of a seeding layer; and crystal growth on the seeding layer by supplying crystal precursors to the crystals for hydrothermal growth. In embodiments of the invention the nanowires consist of metal oxides. The requirement of a seed crystal layer is achieved by any conformal deposition technique, such as, but not limited to, atomic layer deposition (ALD). A method of providing a sufficient supply of chemical precursors in the confined space is achieved by forced infusion of a crystal precursor solution through the confined space.

Although the device and method are illustrated in exemplary embodiments with a metal oxide, specifically ZnO, nanowire formation for the preparation of an electrode on a silicon substrate, other salts or other non-ionic materials that form nanowires can be achieved by using this method to prepare high surface area materials for any application, including, but not limited to: electrodes for sensors, solar cells, lasers, transistors, and supercapacitors; chromatography stationary phases; catalysis supports; or any device that can benefit from very large surface area. The substrate can be any solid conductor, semiconductor, or insulator depending upon the application for the device. In embodiments of the invention the conducting substrate can be metals, metal alloys, graphite metal oxides, polymer, or any other conductor with good dimensional stability at temperature above the temperature at which the nanowires are formed within the trenches. In embodiments of the invention the semiconducting substrate can be any undoped or doped semiconductor, including, but not limited to, Si, Ge, metal oxide, polymer, or any other semiconductor with good dimensional stability at temperature above the temperature at which conformal seeding layer and the nanowires are formed within the trenches. In embodiments of the invention the insulating substrate can be any glass, ceramic, thermoset resin, plastic, natural polymer or any insulator with good dimensional stability at temperature above the temperature at which the nanowires are formed within the trenches. The trenches can be scribed by any method including any mechanical, lithographical, or photolytic process. The trenches can be, for example, about 5 to about 100 µm in width and about 30 to about 500 µm in depth. The trenches can be, for example about 0.5 to about 5 cm in length. The ability to efficiently carry out the method of preparation of the device depends on all three dimensions In embodiments of the invention, hydrothermal growth of metal oxide nanowires depends on the concentration of the crystal precursors, ions, in the vicinity of the growing crystal. The metal oxide can be: ZnO, which is employed in the exemplary embodiments herein; $TiO_2$; SnO; or other metal oxide nanowires. In conventional static hydrothermal growth, where a flat substrate is immersed in a growth solution; the concentration of crystal precursors, ions, in solution depends on the depletion of crystal precursors due to crystallization of ZnO and the replenishment of fresh crystal precursors due to diffusion, convection, or mechanical stirring. Crystal growth in a confined space in a conventional system is limited to a very slow diffusion of fresh precursors into the deep trench, or other confined space, which is a condition where controlled growth of the crystal within the confined space is generally insufficient to compete with uncontrolled crystal nucleation and growth outside of the confined space. In embodiments of the invention, this diffusion limitation on crystal growth is overcome by imposing a forced flow of crystal precursor solution through the confined space of deep trenches.

In an exemplary embodiment of the invention, hydrothermal growth of ZnO nanowires is performed inside an array of parallel deep trenches. The deep trenches are etched in a silicon substrate by deep reactive ion etching (DRIE) and ports to act as inlet and outlet are formed, through which the virgin crystal precursor solution can be introduced and the depleted solution removed from the confined trenches, respectively. After scribing of the trenches, a conformal thin film of ZnO is deposited, wherein all faces of the trenches has a continuous ZnO seeding layer disposed thereon. The thickness of the conformal layer is less than about 5 percent of the width of the trenches and can be as thin as a few nanometers, for example, 2 to 5 nm, in thickness. Subsequently, the ZnO seeded trenches and the inlet and exit ports are sealed with a barrier layer, for example, a polydimethylsiloxane (PDMS) sheet or other material sheet, to seal the top surface without promoting crystallization on its fluid exposed surface. FIG. 1 shows a series of trenches scribed in a silicon substrate with a PDMS barrier layer sealing the top face of the trenches and tubes for the entry and exit of precursor solution. The barrier layer defines microfluidic channels in conjunction with the seeded trenches to which the barrier layer is secured, for example, mechanically, to the top surface of the trenches. Subsequently, an optionally heated crystal precursor solution is pumped from the inlet of the microfluidic channels through the outlet of the microchannels, which optionally are heated, wherein the ZnO crystals in the form of nanowires are grown on the base and sidewalls of the microchannels through the entire length of the channel. Upon removal of the barrier layer, the high surface area electrode comprising trenches with radiating ZnO is exposed, as illustrated by the scanning electron microscopy (SEM) image shown in FIG. 2.

The hydrothermal growth is carried out such that the crystal precursor solution's temperature and rate of flow through the microchannels are controlled. The flow through the microchannels results from imposing a pressure on the solution at the inlet or reducing a pressure at the outlet, which can be considered a "pushing" of the solution at the inlet, or a "pulling" of the solution from the outlet. A syringe, pressurized gas, or pump can be used to impose a pressure on the solution at an inlet and/or a syringe, vacuum chamber, or pump, can be used to reduce the pressure at an outlet. When the solution flows from the inlet to the outlet, a gradient of concentration of the crystal precursor solution results during the process, wherein a higher concentration occurs at the inlet and a lower concentration at the outlet. The difference in concentration from the inlet to the outlet is dependent on the processing variable, including initial crystal precursor concentration in solution, temperature, temperature gradient, flow rate, and effective pressure within the channel. Hence, there is a difference depending upon whether the method is carried out in a pushing or pulling mode as well as the concentration of the solution, temperature, and flow rate. In the limit of flow that is slow and crystal growth rate is high, the concentration gradient can be sufficiently extreme that crystal growth at the vicinity of the inlet can be extensive and little, if any, crystal growth occurs at the exit, where the inlet can form a flow blocking mass.

In an embodiment of the invention, the function of the ports can switch between that of an inlet and an outlet during the process of deposition of the nanowires such that the flow changes direction regularly or irregularly during the deposition period. When the flow is changed regularly, the time average of the crystal precursor concentration over the length of the nanowires can lead to the generation of nearly equal length nanowires at all positions in the trenches.

Figure 2:
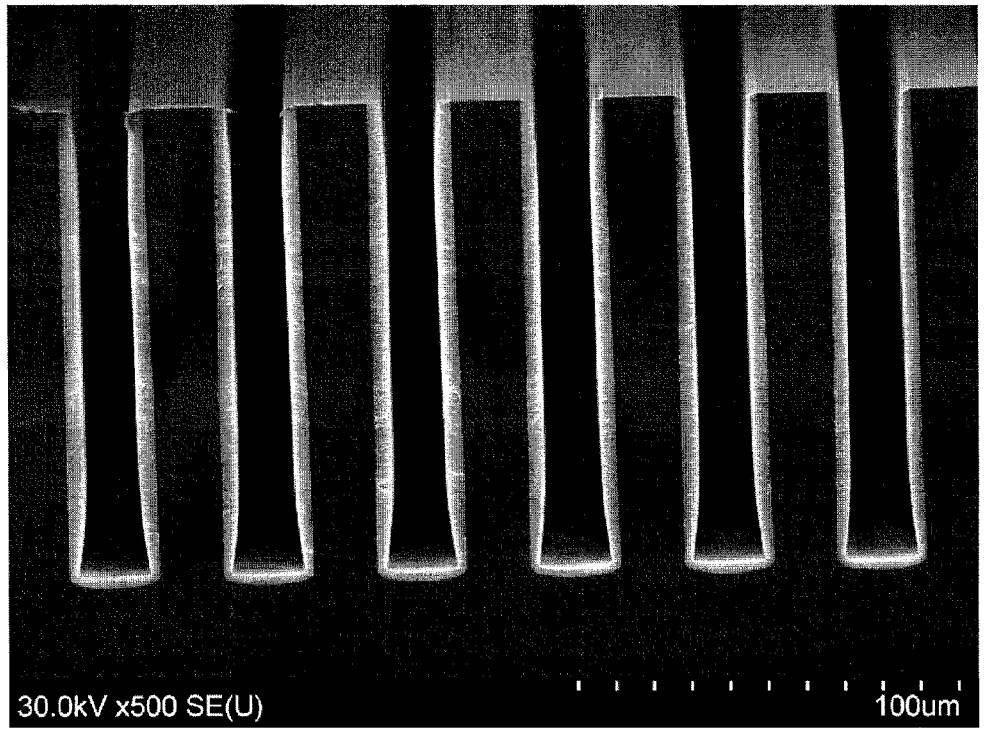
FIG. 2 shows a cross-sectional SEM image of a sample with ZnO nanowires grown along the sidewalls of deep trenches according to an embodiment of the invention.
Figure 3:
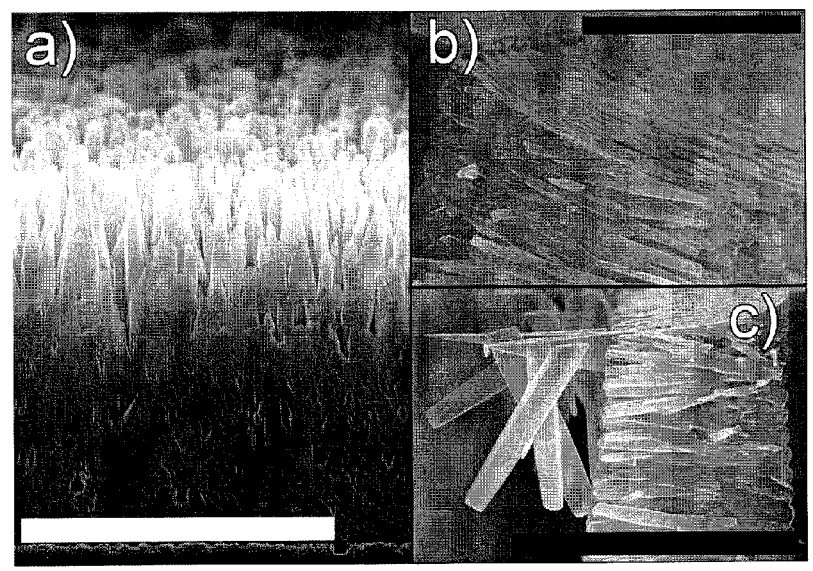
FIG. 3 shows SEM images of a) a top view of ZnO nanowires grown along the side wall of a trench; b) a cross section view of nanowires near the top of the trench; and c) a cross section view of a sample showing trapped large ZnO nanowires nucleated in solution, according to an embodiment of the invention.
Figure 4:
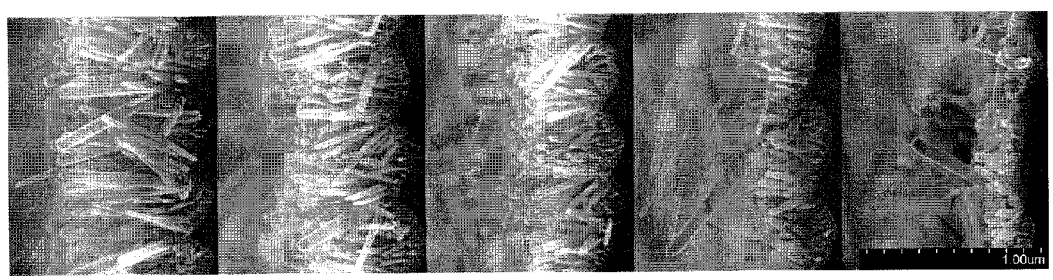
FIG. 4 shows cross-sectional SEM images of ZnO nanowires grown on a sidewall of a 30 μm-wide, 40 μm-deep trench using a conventional prior art hydrothermal route.

As illustrated in FIG. 2, nanorods are formed using a relatively rapid flow rate that results in a relatively uniform layer of ZnO nanowires of similar lengths of about 5 μm over the entire cross-section of the 20 μm wide 120 μm deep channels, with slightly shorter nanorods formed at the base and top portions of the channels. As shown in the SEM images of FIG. 3a, a highly dense ensemble of ZnO nanowires formed which abruptly stops at the top, as shown in 2b, because of the PDMS barrier layer. As can be seen in FIG. 3c, the seed layer on the constrained geometry promotes relatively narrow nanowires relative to the large needles that are otherwise grown in bulk, such as the few that are trapped in the channels. This relatively uniform deposition of ZnO nanowires strongly contrasts to that observed in trenches where crystal growth is carried out in a conventional, non-flowing, manner, where the length of the nanowires differs from about 1 μm in length at the top surface to about 0.4 μm at the base for trenches that are 30 μm wide and 40 μm deep, as illustrated in FIG. 4 with a series of SEM images along the depth of the channels from the top surface.

Figure 5:
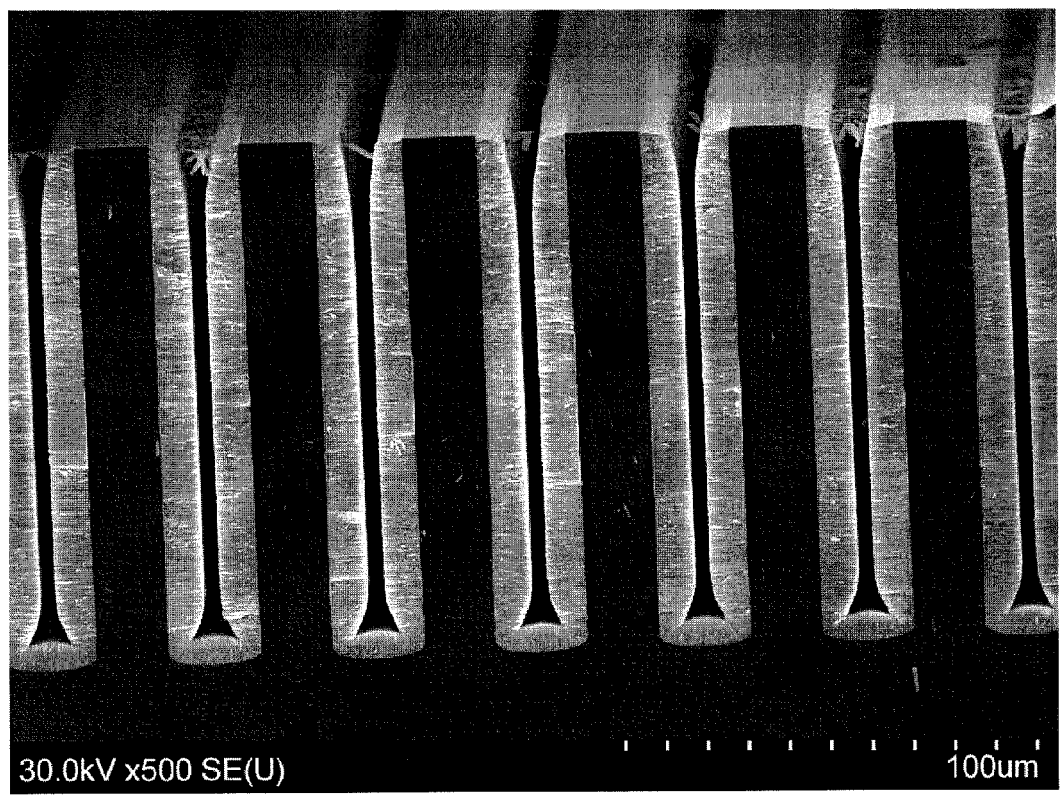
FIG. 5 shows an SEM image of a cross section of ZnO nanowires grown in microchannels from trenches with a width of 20 μm at an initial flow of 0.91 ml/min, according to an embodiment of the invention.
Figure 6:
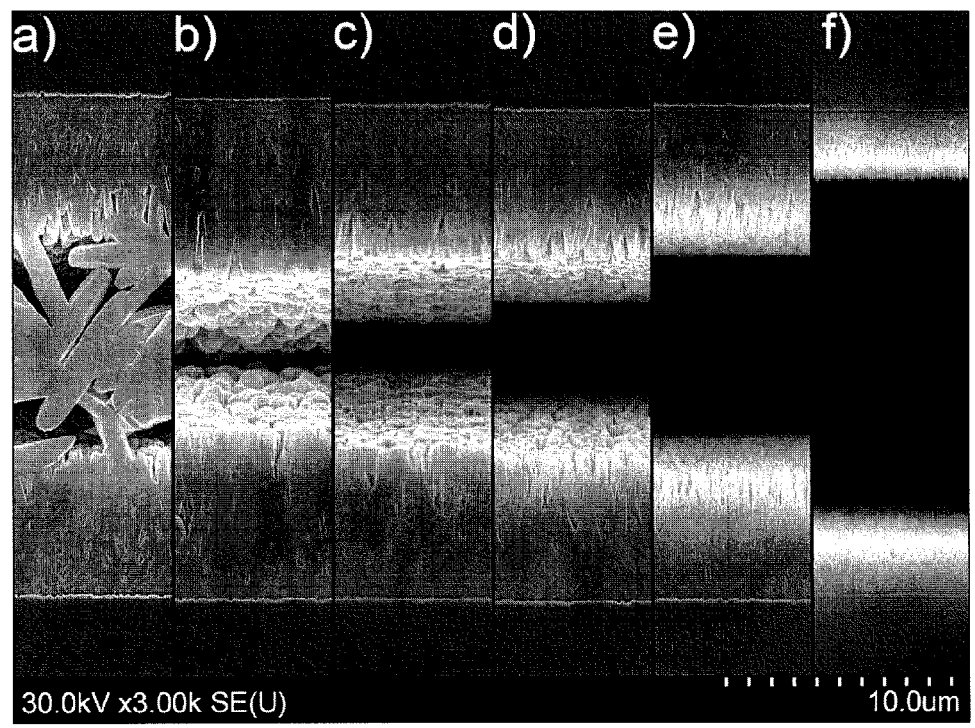
FIG. 6 shows SEM images of a top view of ZnO nanowires grown in a set of trenches with width of 20 μm taken: a) immediately at the entrance, where clogging occurred; b) immediately at the entrance with no clogging; c) 1 mm; d) 2 mm; e) 4 mm; and f) in the vicinity of the outlet, according to an embodiment of the invention.

Depending on the processing parameters, the nanowires differ in length and distribution. For example, using the same crystal precursor composition, when a slow flow rate of 0.55 ml/min is employed, crystallization can occur prior to introduction to the channel, which tends to agglomerate at the vicinity of the inlet, reducing and ultimately blocking flow. To overcome this problem flow rate is increased, which results in few crystals forming in the flowing solution that are of sufficiently large size to promote blockage and significantly reduce flow. As illustrated in the SEM of FIG. 5, few free crystals decorated the ordered aligned nanowires bound to the trenches. The ZnO nanowires grow to about 8 μm in the length, permitting the majority of the 20 μm wide trench to be filled with nanowires. As shown in FIG. 6, the trench displays a gradient of length of ZnO nanowires along the length of the trench, where: lengths of about 11.2 μm form at the inlet, 5b: about 10 μm at a distance of about a millimeter from the inlet, 5c; the length of nanowires is reduced to about 7.1 μm at 4 mm from the inlet, 5e; and reduced to a length of about 3 μm at 9 mm from the inlet, 5f, near the outlet of a 1 cm long trench.

Figure 7:
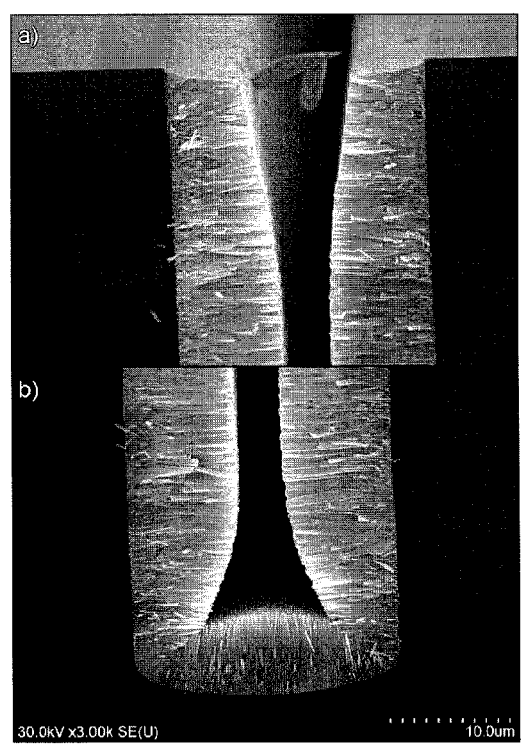
FIG. 7 shows an SEM image of a cross section of ZnO nanowires of FIG. 5 where the image shows a) the upper part of the trench and b) the bottom of the trench, according to an embodiment of the invention.

The ZnO nanowire containing trenches, which are shown in FIG. 5, display shorter nanowires at the top and base areas of the trenches, as shown in FIG. 7. At the top of the trench, the ZnO nanowires do not extend perpendicular to the trench wall but are radiating at an angle toward the base of the trench. The disorientation is a consequence of the distortion of the PDMS sheet that results from mechanical pressure applied to the PDMS sheet in order to seal the microchannels.

Figure 8:
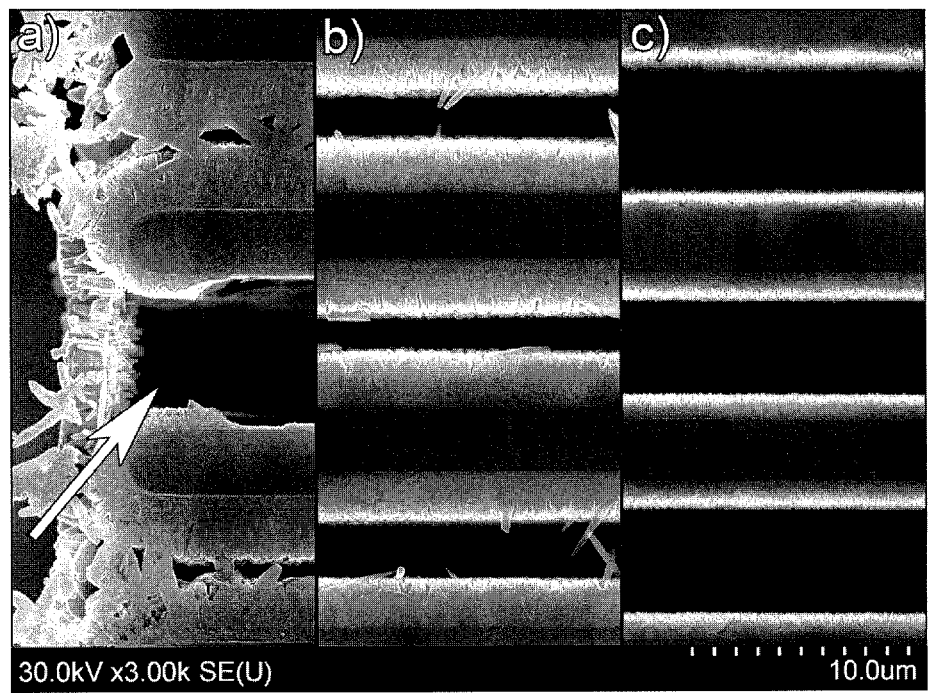
FIG. 8 shows an SEM image of a top view of ZnO nanowires grown in trenches with nominal width of 6.9 μm at a) the entrance, b) 500 μm from the inlet and c) 1000 μm from the inlet, where the arrow points to a trench that had a blocked microchannel.

When the trench's width is narrow, for example, 5 μm in diameter, the maintenance of a constant flow becomes difficult and pulsation readily occurs. The effect of a small width trench is illustrated in FIG. 8, where a 6.9 μm diameter trench displays nanowires of about 3 μm at the inlet, 7a, and nanowires of about 1.3 μm one mm from the inlet. The narrow trenches are very prone to blockage where crystals precipitated from solution readily block entire channels before any significant amount of nanowire can be produced, as indicated by the arrow of FIG. 8a.

Figure 9:
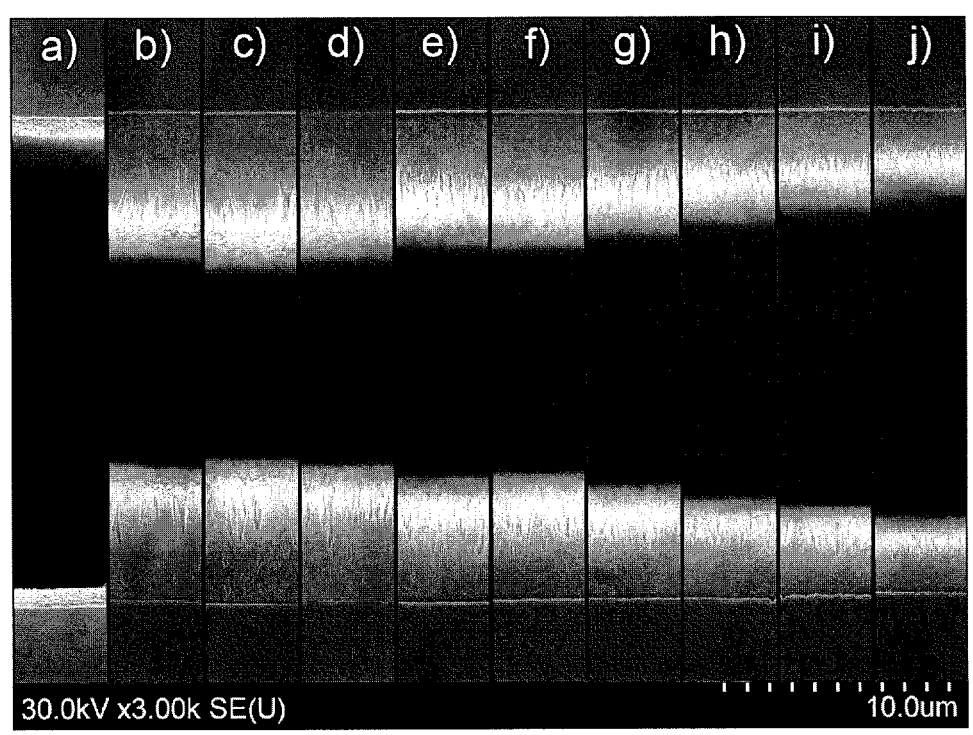
FIG. 9 shows SEM images of a top view of ZnO nanowires grown in a set of trenches with width of 20 μm with growth performed using a pushing configuration taken at: a) the entrance; and b)-j) successively 1 mm from the inlet to the outlet, according to an embodiment of the invention.

The manner by which flow is driven effects the growth of the ZnO nanowires on the seeded walls and crystallization within the solution. The growth of ZnO nanowires using a pushing configuration requires that the PDMS barrier layer is mechanically held in place by the application of pressure on the layer to maintain sealed microchannels. FIG. 9 shows the ZnO nanowires formed in the microchannels using a slow flow rate with a reversal of flow direction periodically for short periods of time, which results in trenches with a more uniform nanowire length throughout the length of the trench. For the nanowire shown in FIG. 9 the direction of flow was reversed approximately every 10 minutes for 10 to 15 seconds and the flow was maintained for two hours. In the vicinity of the inlet to the microchannels the length of nanowires is short, about 1.2 μm, 8a, but a short distance along the trenches, about 1 mm, nanowires of about 5 to 6 μm for the nanowires formed at the top to the bottom of the microchannel, respectively, 8b. Nanowire length reaches a maximum at 3 mm into the trenches with a length of about 5.7 to about 6.8 μm, 8c. The length of the nanowires decreased to about 2.3 μm, 8j, adjacent to the outlet from the microchannels. Few randomly nucleated ZnO crystals are deposited in the trenches under the pushing flow conditions, with deposition of crystals occurring near the inlet but not at the inlet.

Figure 10:
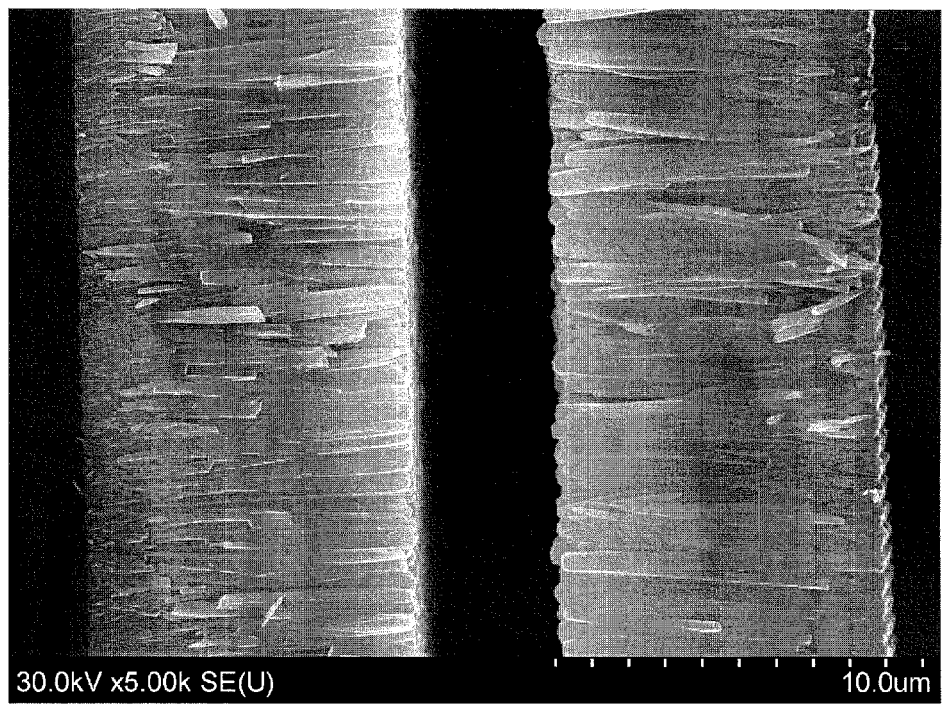
FIG. 10 shows SEM images of the trench of FIG. 5, where the dense packing of individual nanowires is evident, according to an embodiment of the invention.
Figure 11:
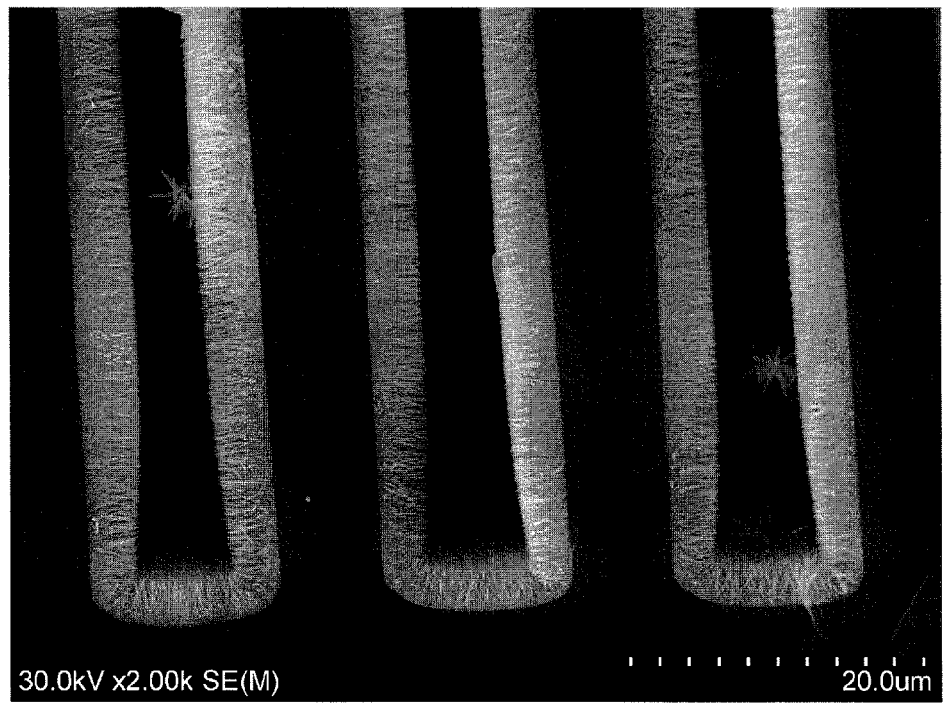
FIG. 11 shows an SEM image of the ZnO nanowires grown in trenches with ammonium hydroxide employed as a crystal growth modifier, according to an embodiment of the invention.
Figure 12:
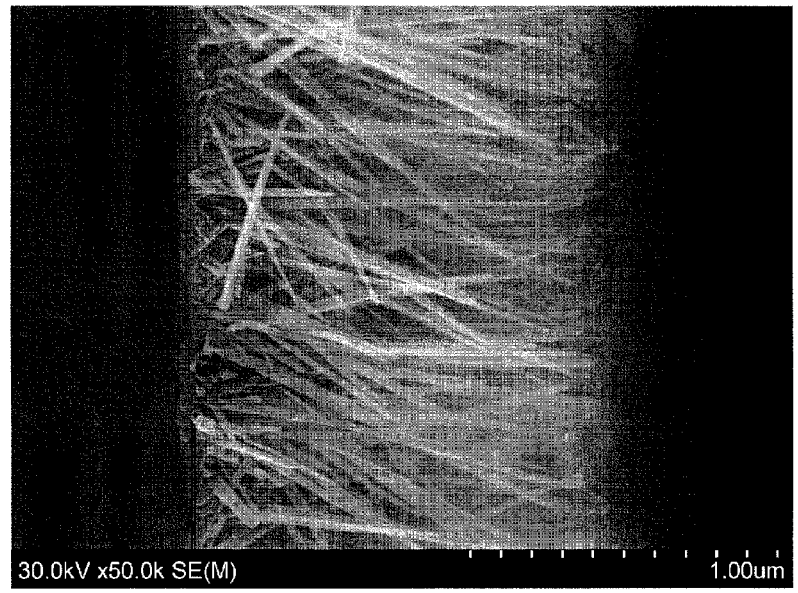
FIG. 12 shows a highly magnified SEM image of the ZnO nanowires on a sidewall of a trench from the trenches of the device shown in FIG. 11, where the addition separation between nanowires is apparent, according to an embodiment of the invention.

Nanowires result from the difference in growth rate on different crystal planes of the growing nanowire and from the deficiency of fresh crystal precursors between nanowires during hydrothermal growth. As the hydrothermal growth occurs, further confining the open space between the growing nanowires on opposing walls, the volume of the microchannel diminishes and flow through the microchannels diminishes and the pressure increases, promoting a larger portion of the flow to occur between the growing nanowires. The increased amount of crystal precursor delivered to the volume between nanowires, increases the crystal growth away from the tip, in the <002> plane, of the nanowires to the sidewalls of the nanowires. In such a case growth occurs not only in <002> plane, but also perpendicular to it. As shown on FIG. 10, the nanowires exposed in a cross section can be discerned from each other with visible crystal planes, but are effectively fusing into one polycrystalline mass. Although, PEI is included into the crystal precursor solution as a growth modifier to inhibit growth of ZnO perpendicular to the <002> direction, greater inhibition occurs upon the addition of ammonium hydroxide, as shown in FIG. 11. At higher magnification, FIG. 12, the SEM image of ZnO nanowires grown with ammonium hydroxide in the crystal precursor solution, clearly displays an ensemble of narrow, well separated nanowires far from a condition of coalescing into a dense polycrystalline mass.

Figure 13:
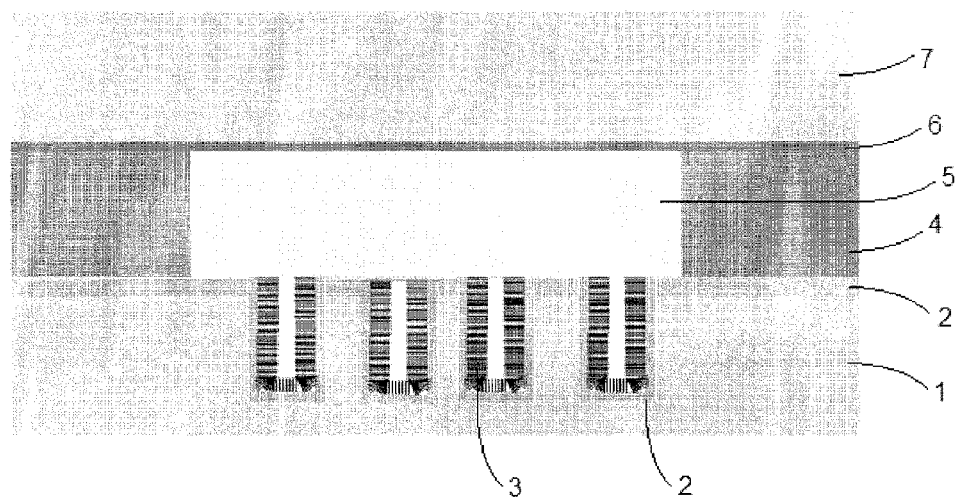
FIG. 13 shows a dye-sensitized solar cell comprising crystalline nanowires radiating from the base and sidewalls of trenches, according to an embodiment of the invention.

In an embodiment of the invention, a dye-sensitized solar cell (DSSC) is constructed with a metal oxide nanowire anode deposited in parallel deep trenches. A non-limiting illustration of a DSSC, according to an embodiment of the invention is shown in FIG. 13, where a scribed substrate 1 is conformally coated with a conductive layer 2 upon which ZnO nanowires 3 are formed. The DSSC is completed by introducing a dielectric spacer 4 that confines an electrolyte 5 to a volume that includes the trenches and a volume above the trenches and below a cathode layer 6, which can be a layer on a second substrate 7. The deep trenches can be prepared by a DRIE method or by a molding technique in a substrate. In an embodiment of the invention, the substrate is transparent in at least a portion of the electromagnetic spectrum that is absorbed by the dye. In other embodiments of the invention, the substrate can be translucent or opaque. The dye can be one that absorbs any portion of the infrared, near-infrared, visible, and/or ultraviolet portion of the spectrum. The substrate can be a semiconductor or insulator. The material can be Si, Ge, SiGe, $SiO_2$, $Al_2O_3$, other metal oxide, a thermoplastic, or a polymeric resin, where the material does not distort at processing temperatures, for example, 100, 110, 120, 130, 140, 150, 160, 170, 180, 190, or 200° C. or greater. The substrate is etched to have trenches that are, for example, 50 to 150 μm in depth and, for example, 5 to 40 μm in width. In an embodiment of the invention, ITO, FTO, or other transparent conductor is deposited in the trenches by ALD or other conformal deposition method, such that the transparent conductor conforms to the walls and base of the trenches. In other embodiments of the invention, the etched substrate can be a conductor, or can be conformally coated with an opaque or translucent conductor. The conformal transparent conductor can be, for example, 5 to 200 nm, or more, in thickness.

As described above for ZnO, the microfluidic growth of the nanowires is carried out after depositing a seed layer of the metal oxide of about, for example, 2 to 5 nm thickness by ALD or other deposition method, where the seed layer can be continuous or discontinuously deposited, for example, as a deposition of nanoparticles of any desired surface density that may provide a desired nanowire density. In embodiments of the invention, the metal oxide can be ZnO, $TiO_2$, $SnO_2$, $WO_3$, or other semiconducting nanowires that can be formed hydrothermally. The metal oxide nanowires are formed to be, for example, of 1 to 10 μm length and, for example, 20 to 40 nm in thickness and spaced apart, for example, by 20 to 60 nm on average. Other lengths, thicknesses, and nanowire densities can be employed to optimize the DSSC. The top of the trenches is sealed with a PDMS sheet or other sheet of relatively low surface energy, such a fluorosilicone, fluorocarbon resin, polyolefin or other sheet that inhibits adherence of metal oxide particles during preparation of the nanowires during the flow process by which the nanowires are formed. The nanowires are washed, for example, with DI water, an alcohol, or other solvent, and dried. The washing and drying can be carried out before or after removal of the sealing PDMS or equivalent sealing sheet. Drying can be by evacuation, heating or any combination thereof. Optionally, the metal oxide nanowires can be further processed, for example, by reaction with oxygen plasma, or in any manner to alter their surface structure, for example, by formation of hydroxyl groups, M—OH groups, on the metal oxide nanowire surfaces.

In embodiments of the invention, the nanowires are treated with a dye. This process can be carried out by pumping a solution of dye or one or more dye precursors, through the PDMS sheet sealed trenches or can be carried out by dip coating, spray coating, or other coating method after removing the sealing sheet. In embodiments of the invention, the nanowire bound dye can be: traditional Ru-complex sensitizers, such as cis-bis(isothiocyanato)bis(2,2'-bipyridyl-4,4'-dicarboxylato) ruthenium(II) or di-tetrabutyl-ammonium cis-bis(isothiocyanato)bis(2,2'-bipyridyl-4,4'-dicarboxylato) ruthenium(II); metal-free organic dyes, such as carbazole based dyes (MK dyes), for example, 2-cyano-3-[5'''-(9-ethyl-9H carbazol-3-yl)-3',3'',3''',4-tetra-n-hexyl-[2,2',5',2'',5'',2''']-quaterthiophenyl-5-yl] acrylic acid (MK-2), bis-fluorenylamine based dyes (JK dyes), for example, ({3,5'-[N,N-bis(9,9-dimethylfluorene-2-yl)phenyl]2,2'-bithiophene-5-yl}-2-cyanoacrylic acid (JK-2), 5'-{4-(N,N-bis[9-phenyl-9H-carbazol-3-yl]phenyl}-3,4'-di-n-hexyl-[2,2']-bithiophenyl-5-cyanoacrylic acid, 5''-{4-(N,N-bis[9-phenyl-9H-carbazol-3-yl]phenyl}-3,4',4''-tri-n-hexyl-[2,2',5',2'']-terthiophenyl-5-cyano-acrylic acid, 2-cyano-3-[4-(4-diphenylamino-phenylethynyl)-2-fluoro-phenyl]-acrylic acid, 3-(4-[4-[bis-(4-methoxy-phenyl)-amino]-phenylethynyl]-2-fluorophenyl)-2-cyano-acrylic acid, 3-(4-[4-[bis-(4-methoxy-phenyl)-amino]-phenylethynyl]-phenyl)-2-cyano-acrylic acid, 2-Cyano-3-[4-[5-(4-diphenylamino-phenylethynyl)-thiophen-2-yl]-2-fluoro-phenyl]-acrylic acid, 3-[4-(5-[4-[bis-(4-methoxy-phenyl)-amino]-phenyl-ethynyl]-thiophen-2-yl)-2-fluoro-phenyl]-2-cyano-acrylic acid, 3-[4-(5-[4-[bis-(4-methoxy-phenyl)-amino]-phenyl-ethynyl]-thiophen-2-yl)-phenyl]-2-cyano-acrylic acid, 3-[4-(5-[4-[bis-(4-methoxy-phenyl)-amino]-phenylethynyl]-thio-phen-2-yl)-3-fluoro-phenyl]-2-cyano-acrylic acid, D-A-type dyes, for example, those disclosed in Kim et al. *Chem. Eur. J.* 2013, 19, 5220-30 and references cited therein; Zn-porphyrin based dyes, for example, those disclosed in Kartikeyan et al. *J. Phys. Chem. A* 2013, 117, 10973-79; Copper(I) dyes, for example, those disclosed in Bozic-Weber et al. *Chem. Commun.* 2013, 49, 7222-4; or perovskite-sensitizers, for example, those disclosed in Burschka et al. *Nature* 2013, 499, 316-9 and references cited therein.

In embodiments of the invention, the redox electrolyte system can be: the traditional $I^-/I^-$ electrolyte, for example, 1,2-dimethyl-3-n-propylimidazolium iodide-LiI-$I_2$-4-tert-butylpyridine in acetonitrile; ferrocene $Fe^{2+}/Fe^{3+}$ electrolyte in acetonitrile; a $Co^{3+/2+}$ electrolyte, for example, cobalt 2,6-bis(1'-butylbenzimidazol-2'-yl)pyridine, $[Co(dbbip)_2]^{3+/2+}$, cobalt tris(-2,2'-bipyridine), $[Co(bpy)_3]^{3+/2+}$, cobalt tris (4,4'-dimethyl-2,2'-bipyridine), $[Co(Me_2bpy)_3]^{3+/2+}$, cobalt tris(4,4'-dit-butyl-2,2'-bipyridine), $[Co(t-Bu_2bpy)_3]^{3+/2+}$, cobalt tris(1,10-phenanthroline), $[Co(phen)_3]^{3+/2+}$, cobalt tris(5-chloro-1,10-phenanthroline), $[Co(Cl-phen)_3]^{3+/2+}$, or cobalt tris(5-niotro-1,10-phenanthroline), $[Co(NO_2\text{-phen})_3]^{3+/2+}$, in acetonitrile; or a hole transport material, for example, Spiro-MeOTAD, 4-tert-butylpyridine, lithium bis(trifluoromethylsulphonyl)imide and tris(2-(1H-pyrazol-1-yl)-4-tert-butylpyridine)cobalt(III) bis(trifluoromethylsulphonyl)imide in chlorobenzene, when using a perovskite-sensitizer. Other solvents can be employed with the electrolyte, as can be appreciated by those of skill in the art.

In embodiments of the invention, a cathode layer is prepared as the counterion to the anode, and can be Pt, functionalized graphene sheets (FGSs), for example, from thermal exfoliation of graphite oxide (GO), contain lattice defects and oxygen-containing functional groups, polyethylenedioxythiophene (PEDOT), carbon nanotubes (CNTs), FTO, or Au, or other metal when a non-traditional electrolyte is used. The cathode can be supported on a second substrate as needed, and can be a transparent substrate when a transparent cathode is employed as a light entry face of the DSSC. In embodiments of the invention, optionally, a dielectric spacer can be situated to separate the anode and cathode that are in electrical communication via the electrolyte.

Methods and Materials

Arrays of closely spaced parallel deep trenches were etched into Si wafers using a DRIE method. The nominal length of the trenches was about one cm. On opposing ends of the parallel trenches, an inlet and an outlet were formed for entrance and exit of crystal precursor solutions into the trenches. ZnO seeding layers were grown on the surfaces of the trenches by atomic layer deposition, using a thermal ALD (Savannah 100, Cambridge Nanotechnology Inc.) at 250° C., where Diethyl zinc (DEZ) and $H_2O$ acted as precursors. Deposition of the seed layer resulted from sequence exposures of: 0.015 sec water exposure; 8 sec $N_2$ purge; 0.015 sec $Et_2Zn$ exposure; and 8 sec $N_2$ purge. The patterned wafers with seeded trenches were covered with PDMS sheets to act as a barrier layer at the top of the trenches to form channels extending from the inlets to the outlets. Syringe needles were fixed to the inlet and outlet reservoirs of the channels. Sealing of the channels was carried out by applying pressure to the PDMS sheet to ensure good contact between PDMS and the top surface of the silicon substrate. The Si wafer was placed on a polished aluminum heat sink resting on a hotplate to control the heating.

The inlet and outlet needles were connected to a microfluidic peristaltic pump and a heated beaker filled with growth solution. A 0.2 µm pore size syringe filter was placed before the inlet to restrict any crystals formed in solution prior to entry to the inlet.

The crystal precursor solution was prepared by mixing zinc nitrate and hexamine in deionized water to achieve a solution that was 25 mM in each reagent. Prior to introduction to the inlet, crystal precursor solutions were maintained at room temperature or heated to 85° C. When the crystal precursor solution was not preheated, the rapid formation of crystals at the inlet caused blocking of the microchannels and the loss of flow. Polyethyleneimine (PEI), 54 mg per 250 mL of crystal precursor solution, was added as a crystal growth modifier. An additional crystal growth modifier, of 28% ammonium hydroxide, 5 mL, was added to 250 mL of solution for some ZnO nanowire preparations.

The crystal precursor solution was pumped through the sealed high aspect ratio microchannels with various flow rates of 0.55 ml/min and 0.91 ml/min. Flow rates were reduced through the microchannels when plugged by ZnO crystals precipitated from solution and their deposition in the microchannels. Pumping was maintained until no measurable flow occurred through the microchannels or after three hours of pumping. Typically, the syringe pump was configured to "pull" crystal precursor solution from the inlet to the outlet. In some experimental runs, the syringe pump was configured to "push" crystal precursor solution from the inlet to the outlet. The pulling situation more easily maintained the sealing of the barrier sheet. The direction of flow with pushing was reversed from the inlet to the outlet was reversed periodically to promote an even distribution of the crystal precursor solution, and to discourage blockage of the trenches by any large crystals that were not nucleated by the conformal seeding layer. For example, the flow was reversed from pushing to pulling for 15 seconds every 10 minutes.

It should be understood that the examples and embodiments described herein are for illustrative purposes only and that various modifications or changes in light thereof will be suggested to persons skilled in the art and are to be included within the spirit and purview of this application.

We claim:

1. A method of preparing a high surface area device, comprising:
providing a substrate scribed with a multiplicity of trenches, wherein the trenches have widths of 5 to 100 µm;
optionally, forming a conformal coating of an electrically conductive material over the trenches, and, optionally, tops of the trenches, wherein the conformal coating is 5 nm to 10 µm in thickness and occupies 20 percent or less of the width of the trenches;
depositing a conformal seed layer over the trenches on the substrate, wherein the conformal seed layer has a thickness of 1 nm to 5 µm and occupies 5 percent or less of the width of the trenches;
fixing a barrier layer onto the substrate over the open end of the trenches, wherein microchannels are defined by a surface of the barrier layer and the sidewalls and base of the trenches;
forming a plurality of ports contacting the microchannels, wherein at least one first port resides at a first end of the length of the trenches and at least one second port resides at a second end of the trenches; and
imposing a flow of a crystal precursor solution through the micro channel, wherein the microchannels are maintained at a constant temperature during the period of time that the flow is maintained, and wherein crystalline nanorods grow perpendicularly from the sidewalls and base of the trenches from the conformal seed layer.

2. The method according to claim 1, wherein the substrate is a conductor, semiconductor, or an insulator.

3. The method according to claim 1, wherein the substrate is silicon.

4. The method according to claim 1, wherein the barrier layer is a polydimethylsiloxane sheet.

5. The method according to claim 1, where the conformal seed layer is a metal oxide and depositing is by atomic layer deposition.

6. The method according to claim 5, wherein the metal oxide is zinc oxide.

7. The method according to claim 6, wherein the crystal precursor solution comprises a water soluble zinc salt and an amine in water.

8. The method according to claim 7, wherein the zinc salt is zinc nitrate and the amine is hexamine.

9. The method according to claim 7, wherein the crystal precursor solution further comprises a crystal growth modifier.

10. The method according to claim 9, wherein the crystal growth modifier comprises polyethyleneimine and/or ammonium hydroxide.

11. The method according to claim 1, wherein imposing a flow results from providing a pressure on the crystal precursor solution at a first port and/or reducing a pressure at a second port.

12. The method according to claim 1, wherein direction of the flow switches from the first port through the second port to from the second port through the first port.

13. The method according to claim 1, wherein the temperature is above ambient and below the boiling point of the solvent of the crystal precursor solution.

14. The method according to claim 1, further comprising preheating the crystal precursor solution prior to imposing a flow of the crystal precursor solution.

* * * * *

UNITED STATES PATENT AND TRADEMARK OFFICE
CERTIFICATE OF CORRECTION

PATENT NO.       : 9,443,662 B2                                Page 1 of 1
APPLICATION NO.  : 14/074280
DATED            : September 13, 2016
INVENTOR(S)      : Mikhail Ladanov et al.

It is certified that error appears in the above-identified patent and that said Letters Patent is hereby corrected as shown below:

In the Specification

Column 4,
Line 4, "three dimensions" should read --three dimensions.--.

Column 8,
Line 13, "2-cyano-3-[5'''-(9-ethyl-9Hcarbazol-3-yl)-3'" should read --2-cyano-3-[5'''-(9-ethyl-9Hcarbazol-3-γl)-3'--.
Line 44, "traditional I⁻/I" should read --traditional $I^-/I_3^-$--.
Lines 48-49, "[Co(dbbip)$_2$]$^{3+/}{}_{2+}$," should read --[Co(dbbip)$_2$]$^{3+/2+}$--.
Line 54, "*tris*(5-niotro-1,10-phenanthroline)" should read --*tris*(5-nitro-1,10-phenanthroline)--.

Signed and Sealed this
Seventh Day of March, 2017

Michelle K. Lee
*Director of the United States Patent and Trademark Office*